(12) United States Patent
Clarke et al.

(10) Patent No.: US 9,703,772 B2
(45) Date of Patent: Jul. 11, 2017

(54) SYSTEM AND METHOD FOR AUTOMATED ALERTS IN ANTICIPATION OF INAPPROPRIATE COMMUNICATION

(71) Applicant: CONVERSATIONAL LOGIC LTD., London (GB)

(72) Inventors: Matthew Clarke, London (GB); Marek Robertson, London (GB)

(73) Assignee: CONVERSATIONAL LOGIC LTD., London (GB)

(*) Notice: Subject to any disclaimer, the term of this patent is extended or adjusted under 35 U.S.C. 154(b) by 0 days.

(21) Appl. No.: 14/858,803

(22) Filed: Sep. 18, 2015

(65) Prior Publication Data

US 2016/0098392 A1 Apr. 7, 2016

Related U.S. Application Data

(60) Provisional application No. 62/060,855, filed on Oct. 7, 2014.

(51) Int. Cl.
*H04L 9/32* (2006.01)
*G06F 12/14* (2006.01)
*G06F 17/27* (2006.01)
*G09G 5/377* (2006.01)
*G09G 5/00* (2006.01)
(Continued)

(52) U.S. Cl.
CPC .......... *G06F 17/2775* (2013.01); *G06F 3/016* (2013.01); *G06F 3/0227* (2013.01); *G06F 3/0237* (2013.01); *G06F 3/04886* (2013.01); *G06F 9/4446* (2013.01); *G06F 17/30864* (2013.01); *G06F 21/552* (2013.01); *G06F 21/6245* (2013.01); *G09G 5/005* (2013.01);
*G09G 5/377* (2013.01); *H04L 63/0428* (2013.01); *H04W 12/02* (2013.01); *G06F 2221/031* (2013.01); *G09G 2340/125* (2013.01); *G09G 2354/00* (2013.01); *G09G 2358/00* (2013.01)

(58) Field of Classification Search
CPC .............. G06F 17/2775; G06F 21/552; G06F 21/6245; G06F 17/30864; G06F 3/04886; G06F 3/0227; G06F 2221/031; H04W 12/02; G09G 5/005; G09G 5/377; G09G 2358/00; G09G 2354/00; G09G 2340/125; H04L 63/0428
USPC ............................................ 713/168; 726/22
See application file for complete search history.

(56) References Cited

U.S. PATENT DOCUMENTS

5,835,722 A * 11/1998 Bradshaw ......... G06F 17/30867
707/E17.109
8,347,380 B1 * 1/2013 Satish ..................... G06F 11/00
708/200
(Continued)

*Primary Examiner* — Aravind Moorthy
(74) *Attorney, Agent, or Firm* — F. Chau & Associates, LLC (57) ABSTRACT

A method for providing a sensitive text alert includes monitoring a key selected on a keyboard of a computer system. The key selected is reported to a key-logger application executing on the computer system. The reported key selected is appended to a string file. At least one portion of the string file is compared to a database of sensitive words/phrases. An alert is generated when it is determined that the compared at least one portion of the string file matches an entry in the database of sensitive words/phrases. The generated alert is superimposed on a display device of the computer system.

18 Claims, 8 Drawing Sheets

(51) Int. Cl.
*G06F 3/02* (2006.01)
*G06F 3/0488* (2013.01)
*H04L 29/06* (2006.01)
*G06F 17/30* (2006.01)
*G06F 21/62* (2013.01)
*H04W 12/02* (2009.01)
*G06F 21/55* (2013.01)
*G06F 9/44* (2006.01)
*G06F 3/01* (2006.01)
*G06F 3/023* (2006.01)

(56) References Cited

U.S. PATENT DOCUMENTS

| | | | | |
|---|---|---|---|---|
| 2003/0052805 A1* | 3/2003 | Troy | ............ | H03M 3/392 341/143 |
| 2005/0251802 A1* | 11/2005 | Bozek | ............ | G06F 9/5077 718/1 |
| 2006/0036570 A1* | 2/2006 | Schaefer | ............ | G06F 9/44505 |
| 2006/0101128 A1* | 5/2006 | Waterson | ............ | G06F 21/52 709/212 |
| 2007/0079386 A1* | 4/2007 | Metzger | ............ | G06F 21/6227 726/29 |
| 2007/0091070 A1* | 4/2007 | Larsen | ............ | G06F 3/0213 345/168 |
| 2007/0123221 A1* | 5/2007 | Mazenier | ............ | H04M 1/72572 455/412.2 |
| 2007/0182714 A1* | 8/2007 | Pemmaraju | ............ | G06F 21/83 345/168 |
| 2008/0055053 A1* | 3/2008 | Hanyu | ............ | G08B 3/10 340/326 |
| 2008/0294915 A1* | 11/2008 | Juillerat | ............ | G06F 1/266 713/300 |
| 2008/0301816 A1* | 12/2008 | Ting | ............ | G06F 21/41 726/26 |
| 2009/0254944 A1* | 10/2009 | Watson | ............ | H04M 19/04 725/58 |
| 2009/0254994 A1* | 10/2009 | Waterson | ............ | G06F 21/83 726/26 |
| 2009/0313643 A1* | 12/2009 | Su | ............ | G06F 9/45537 719/323 |
| 2010/0280828 A1* | 11/2010 | Fein | ............ | G10L 13/00 704/246 |
| 2011/0145918 A1* | 6/2011 | Jung | ............ | G06F 21/52 726/22 |
| 2011/0191097 A1* | 8/2011 | Spears | ............ | G06F 17/28 704/9 |
| 2013/0019191 A1* | 1/2013 | Arnold | ............ | G06F 3/04886 715/765 |
| 2013/0237287 A1* | 9/2013 | Ferren | ............ | H04W 4/16 455/566 |
| 2014/0310538 A1* | 10/2014 | Xu | ............ | H02H 7/20 713/300 |
| 2014/0364103 A1* | 12/2014 | Marti | ............ | H04W 4/021 455/418 |

\* cited by examiner

SYSTEM AND METHOD FOR AUTOMATED ALERTS IN ANTICIPATION OF INAPPROPRIATE COMMUNICATION

CROSS-REFERENCE TO RELATED APPLICATION

The present application is based on provisional application Ser. No. 62/060,855, filed Oct. 7, 2014, the entire contents of which are herein incorporated by reference.

TECHNICAL FIELD

The present disclosure relates to automated alerts and, more specifically, to systems and methods for automated alerts in anticipation of inappropriate communication.

DISCUSSION OF THE RELATED ART

The proliferation of computers has led to vast amounts of electronic text-based communication in the workplace, principally via e-mail and chat systems. It is also becoming increasingly common for employees to engage in the posting of comments to websites, blogs and social networking services via a web browser. Because electronic communication outside work is often of an informal nature, workers, when using the same methods of electronic communication in the workplace, often send messages of the wrong register which can breach internal policies or introduce reputational or litigation risk to their organization. These messages are often stored indefinitely and may represent an enduring risk to the employer organization and/or the employees.

Several approaches have been developed to mitigate reputational and liability risk associated with employee electronic communication. For example, organizations may inspect IP packet contents as it leaves corporate networks. This approach may determine if the packets contain potentially inappropriate text and may generate an alert so that potentially risky communications may come to light after the fact. While this approach may serve to help organizations identify future risks, often the problem is detected after damage has been done.

Another approach that may be used by organizations is to block ports associated with chat clients, block internet access to social media services blogs and personal web-based email portals, and/or to inspect email contents at the email server level. While this approach may reduce risks associated with errant communications, it may also serve to limit the ability of employees to pursue the organization's business opportunities through diverse and emerging media outlets.

Another approach for monitoring communication may be to install or develop functionality at individual application level. For example, an e-mail client may be configured to inspect IP packet content before the packets leave the network and demand that the user rephrase the message before traffic is permitted to pass. However, this approach may be difficult, expensive, or impractical to implement as developing a consistent mechanism across every individual software package used within an organization may involve significant resources, especially when such packages are subject to routine updates. Furthermore, such an approach may reduce employee productivity as the employees may receive notification of an inappropriate communication at the point of sending a complete draft, when rephrasing may be more difficult or time-consuming.

SUMMARY

A method for providing a sensitive text alert includes monitoring a key selected on a keyboard of a computer system. The key selected is reported to a key-logger application executing on the computer system. The reported key selected is appended to a string file. At least one portion of the string file is compared to a database of sensitive words/phrases. An alert is generated when it is determined that the compared at least one portion of the string file matches an entry in the database of sensitive words/phrases. The generated alert is superimposed on a display device of the computer system.

The monitoring and reporting of the key selected may be performed by a custom or modified keyboard driver installed on the computer system.

The monitoring and reporting of the key selected may be performed by periodically query an operating system executing on the computer system for keyboard activity using an API hook.

The database of sensitive words/phrases may be periodically updated from a central repository that is connected to the computer system over a computer network.

Generating the alert may includes determining an alert category by reading alert-category information associated with a matched entry from the database of sensitive words/phrases; and generating a custom alert for the determined alert category.

The generated alert may be canceled when a monitored subsequent key selected is appended to the string file that negates the match.

The superimposing of the alert on the display device may be performed by a custom or modified display driver installed on the computer system.

In addition to superimposing the generated alert on a display device of the computer system, a sound may be generated.

The method may further include encrypting the at least one portion of the string file, transmitting the encrypted at least one portion of the string file, as a log file, to a remote server over a computer network, when it is determined that the at least one portion of the string file matches the entry in the database of sensitive words/phrases.

A system for providing a sensitive text alert includes a keyboard input port for receiving a keyboard signal from a keyboard device. A logic unit receives the keyboard signal from the keyboard input port. A keyboard output port passes the received keyboard signal from the keyboard input port to a computer system. A video input port receives a video signal from the computer system. A video output port passes the received video signal from the video input port to the video output port. The logic unit is configured to compare the received keyboard signal to a database of sensitive words/phrases, determine when a match has been made between at least a portion of the received keyboard signal and an entry in the database of sensitive words/phrases, generate an alert when it is determined that a match has been made, and superimpose the generated alert over the received video signal before it is passed to the video output port.

The system may further include a power input port for receiving electrical power; a power output port for supplying the computer system with the electrical power received by the power input port; and a power disconnection circuit configured to interrupt power sent from the power input port to the power output port upon receiving an instruction to do so from the logic unit. The logic unit may be additionally configured to send instructions to interrupt power to the power disconnection circuit when the generated alert meets predetermined criteria.

The system may additionally include a speaker unit to produce a predetermined sound when an alert has been generated.

The system may additionally include a light display unit to produce a predetermined light display when an alert has been generated.

The system may additionally include a local area network adapter or a WiFi adapter to receive updates to the database of sensitive words/phrases from a remote server via a computer network without the involvement of the computer system.

The system may additionally include a local area network adapter or a WiFi adapter to send an indication of the generated alert to a remote server via a computer network without the involvement of the computer system.

The system may additionally include a digital-to-analogue converter for converting the received video signal into an analogue video signal; a graphics processor device of the logic unit for superimposing the generated alert over the analogue video signal; and an analogue-to-digital converter for converting the alert-superimposed analogue video signal into a digital video signal for being passed to the video output port.

The system may additionally include a security protocol, embodied in the logic unit, for encrypting the received keyboard signals and transmitting the encrypted keyboard signals to a central server as a log file when it is determined that a match has been made between the at least a portion of the received keyboard signal and the entry in the database of sensitive words/phrases.

A method for providing a sensitive text alert includes monitoring key selection data on a custom on-screen keyboard installed on a mobile electronic device and transmitting the key selection data, from the custom on-screen keyboard, to a central server via an Internet connection maintained by the mobile electronic device. An indication is received from the central server when the key selection data is determined to be a sensitive word/phrase. An alert is generated when the indication is received. The generated alert is displayed on a display device of the mobile electronic device.

The displaying of the generated alert may be performed by the custom on-screen keyboard.

The custom on-screen keyboard may stop receiving key selection data for a predetermined length of time when the indication is received.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide various systems and methods for the effective mitigation of reputational and liability risks associated with inappropriate electronic communications. Some exemplary embodiments of the present invention utilize specialized hardware for analyzing textual input and generating alert messages in real-time to inform a user that potentially inappropriate language has been keyed so as to give the user an opportunity to reflect upon the potential risks associated with the keyed text before the communication has been irreversibly sent. Other exemplary embodiments of the present invention may be implemented at a software-level into existing computers and terminals used by employees. While the software-implemented approaches may be less expensive to implement, the hardware-implemented approaches may be especially robust and may work well with a wide variety of different computer systems and dumb terminals, without regard to the operating system being used.

Exemplary embodiments of the present invention may focus on providing a user with a real-time monitoring of keyed text so that when a potentially inappropriate word of phrase has been keyed, an alert message may appear on the user's display device in a manner that is easily observable but does not interfere with the ability of the user to continue conducting normal operation.

Figure 1:
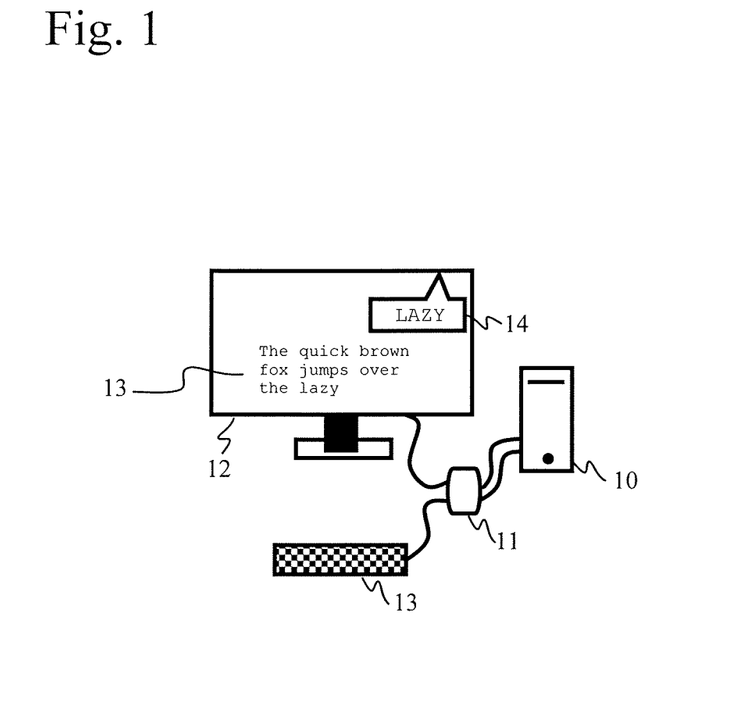
FIG. 1 is a schematic diagram illustrating a hardware-implemented approach for real-time sensitive word and phrase detection and alerting in accordance with exemplary embodiments of the present invention.

FIG. 1 is a schematic diagram illustrating a hardware-implemented approach for real-time sensitive word and phrase detection and alerting in accordance with exemplary embodiments of the present invention. According to this exemplary embodiment, specialized hardware is provided. This specialized hardware may be referred to as a Text Analyzer 11, although its function may be substantially more involved, as described below. The Text Analyzer 11 may be installed between the user's keyboard 13 and the computer system 10 and may analyze the key stroke data as it passes therethrough. The text analyzer 11 may also be installed between the user's computer 10 and display device 12 so as to superimpose alert messages over the computer's operating environment. In this way, user-inputted text 13 may be analyzed and alerts 14 may be displayed regardless of the type of computer system 10 being used and the device may continue to work effectively even as the operating environment of the computer system 10 changes, for example, via operating system updates and the like.

Because exemplary embodiments of the present invention may be hardware-implemented in the manner described, the disclosed system may operate effectively for computers based on Microsoft WINDOWS, Apple MACINTOSH, Google CHROMEBOX, various implementations of Linux, and even dumb terminals. These systems may also be able to perform well even where a user has booted the computer system from an external boot disk, optical disc or USB drive rather than the installed operating system.

As the text analyzer 11 receives keyed text data from the keyboard 13, the text analyzer 11 may, using its own processing unit, identify potentially inappropriate words and phrases and superimpose an alert 14 on the display device 12 by superimposing image data onto the image data being sent from the computer system 10 to the display device 12. As shown in FIG. 1, the alert 14 may be embodied as a text box popup, for example, in the upper-right hand corner of the screen of the display device 12, which displays the potentially inappropriate word as the text is being keyed. While the text box popup may be superimposed at any location, the corners may work particularly well as they may be easily observed and less likely to interfere with the computer's operation. The text box may appear for a predetermined period of time and may even change or disappear in real-time as the potentially inappropriate word is appended to such that it is no longer inappropriate.

Figure 2:
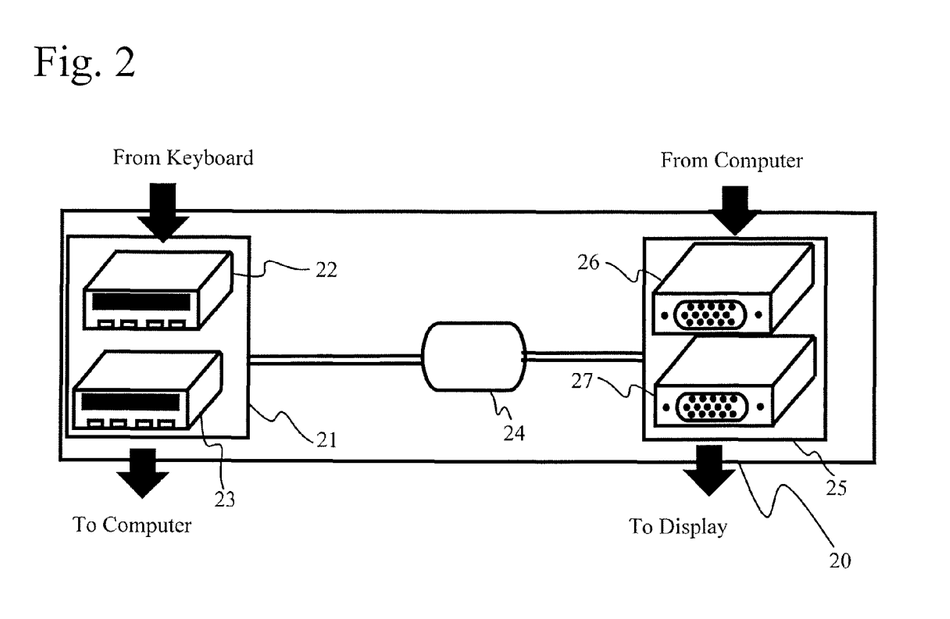
FIG. 2 is a schematic diagram illustrating a configuration of the disclosed text analyzing apparatus according to an exemplary embodiment of the present invention.

FIG. 2 is a schematic diagram illustrating a configuration of the disclosed text analyzing apparatus 20 according to an exemplary embodiment of the present invention. Even though the segments of the diagram are illustrated as being distinct, according to exemplary embodiments of the present invention, all of the various segments may be instantiated in a single unit. The apparatus 20 may include a key logger component 21 that may include a first connector port 22 for receiving a connection from the keyboard and a second connector port 23 for connecting to the computer. The keyboard is thus connected to the computer only through the key logger component 21 and not directly. These connector ports 21 and 22 may be USB ports, although they may also be PS2 ports or any other port by which a keyboard may be connected to a computer. The two ports may be of opposite gender so that standard USB cables may be used.

The key logger component 21 is connected to a logic unit component 24. The logic unit component 24 may include a storage unit such as flash memory, and a processing unit, such as a system-on-chip. The logic unit component 24 may include firmware and/or software for comparing keyed text against a database of potentially inappropriate words or phrases and to generate an alert when a match has been detected.

The apparatus 20 may additionally include an image overlay component 25, which may include a connector port for receiving a display signal from the computer 26 and a connector port for providing the received display signal out to the display device 27. These connector ports may be VGA ports, HDMI ports, DVI ports Display Port ports, and the like. The two ports may be of opposite gender so that standard display cables may be used.

The image overlay component 25 may, in normal operation, simply pass through the display signal from computer to display device, but when the logic unit component 24 detects a match and generates an alert, the alert may be superimposed on the display signal. Where the display image sent from the computer is an analogue display signal, such as a VGA display signal, the image overlay component 25 may add the alert display signal to the computer's display signal. Where the display image sent from the computer is a digital display signal, such as a DVI display signal, the image overlay component 25 may decode the digital image signal, add the alert image signal, and then re-encode the digital image signal. Accordingly, the image overlay component 25 may include a digital-to-analogue converter as well as an analogue-to-digital converter. Where the display signal is a digital signal that has been encrypted according to HDCP or another standard, the image overlay component may decrypt the HDCP signal prior to decoding and superimposing and may then re-encrypt the superimposed image signal after re-encoding.

Figure 3:
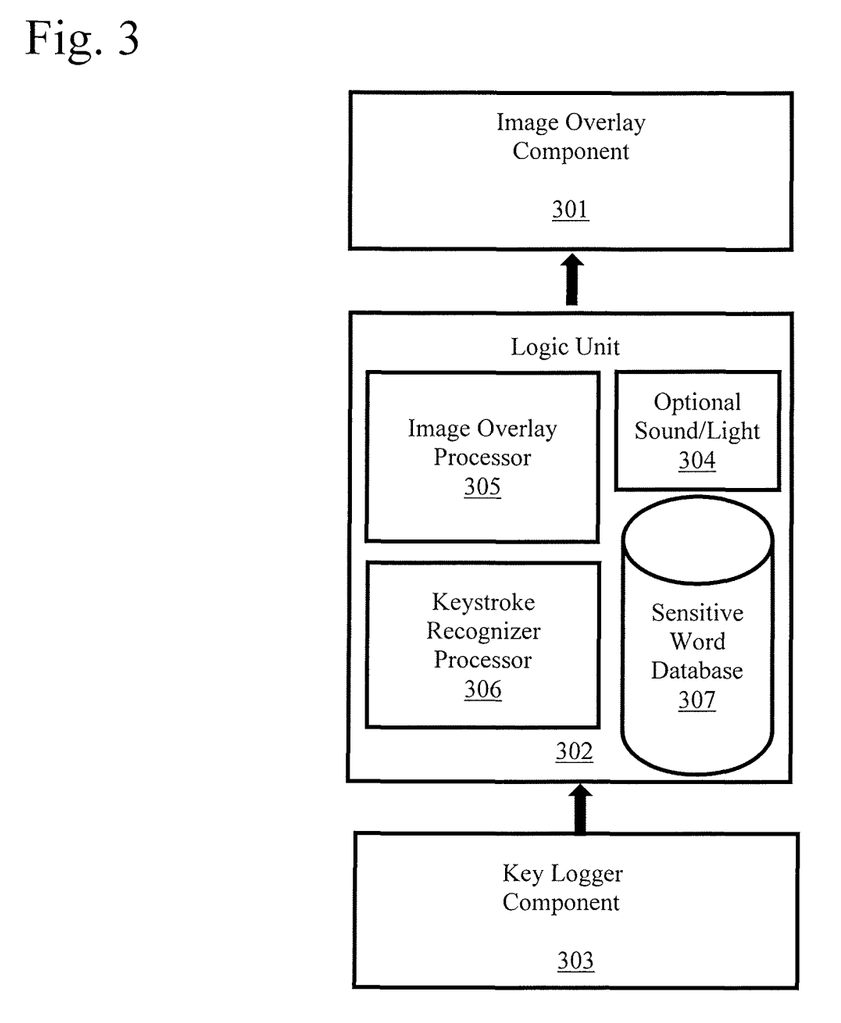
FIG. 3 is a functional block diagram illustrating a configuration of the disclosed text analyzing apparatus according to an exemplary embodiment of the present invention.

FIG. 3 is a functional block diagram illustrating a configuration of the disclosed text analyzing apparatus according to an exemplary embodiment of the present invention. The Text Analyzer may include an image overlay component 301, a key logger component 303 and a Logic Unit 302. The Logic Unit 302 may be a system-on-chip or another form of highly compact computing device. The Logic Unit 302 may include a Keystroke Recognizer unit 306 for receiving keyed character text and determining when any word or phrase has been entered, for example, the Keystroke Recognizer unit 306 may be able to interpret spaces and hard returns to determine when a new word/phrase is being entered. The Keystroke Recognizer unit 306 may then compare a string against a sensitive word database 307 to determine when a sensitive word or phrase has been entered. The sensitive word database 307 may include, not only whole words and phrases, but also partial words/phrases that use wildcards such as "*" to represent a suffix of arbitrary length, "?" to represent a single character, etc.

For example, the Keystroke Recognizer unit 306, beginning with a space, punctuation mark, or hard return, may append each keyed character to the end of a string file and then check the string file against the sensitive word database until a hit is made or a word/phrase has ended, either by the introduction of another space, punctuation, hard return or upon the exceeding of a predetermined string file length. For example, if a "c" is keyed first, the "c" will be inserted into a blank string file and the sensitive word database will be checked for the string "c". Then, if an "a" is keyed, the "a" may be appended to the string file and the sensitive word database will be checked for the string "ca". Then, if an "r" is keyed, the "r" may be appended to the string file and the sensitive word database will be checked for the string "car." If a match is made, the keystroke recognizer unit may generate an alert. The alert may then be canceled, for example, if the next key pressed is "t" but may persist if the next key pressed is a punctuation, space or hard return (assuming "car" is a sensitive word and "cart" is not). Exemplary embodiments of the present invention may additionally be configured to be more or less sensitive as suits the organization's risk profile by triggering varying degrees of fuzzy (i.e. non exact) matches.

Upon the generation of the alert, an Image Overlay Processor 305 may be responsible for superimposing the popup text box, for example, as described above.

As described above, exemplary embodiments of the present invention may be embodied as software executing on a general purpose computer system rather than as specialized hardware. In this case, the software may include software components at least similar to those discusses above pertaining to hardware.

In addition to creating the visual alert, exemplary embodiments of the present invention may have an optional sound/light component 304 that may generate an audible alert, such as a particular sound, and/or a visual alert, such as a blinking light. The sound/light component 304 may accordingly include a speaker unit and/or one or more LEDs of various colors. These added alerts may be used either in addition to the popup text alert or in place of it. The sound may be particularly effective in influencing user behavior as other people in the office environment may recognize the sound as having been triggered by the keying of a potentially sensitive word or phrase. The sound may be generated by a digital synthesizer module and speaker module integrated within the Text Analyzer, or the sound may be provided to the computer via a speaker or headphone cable.

Figure 4:
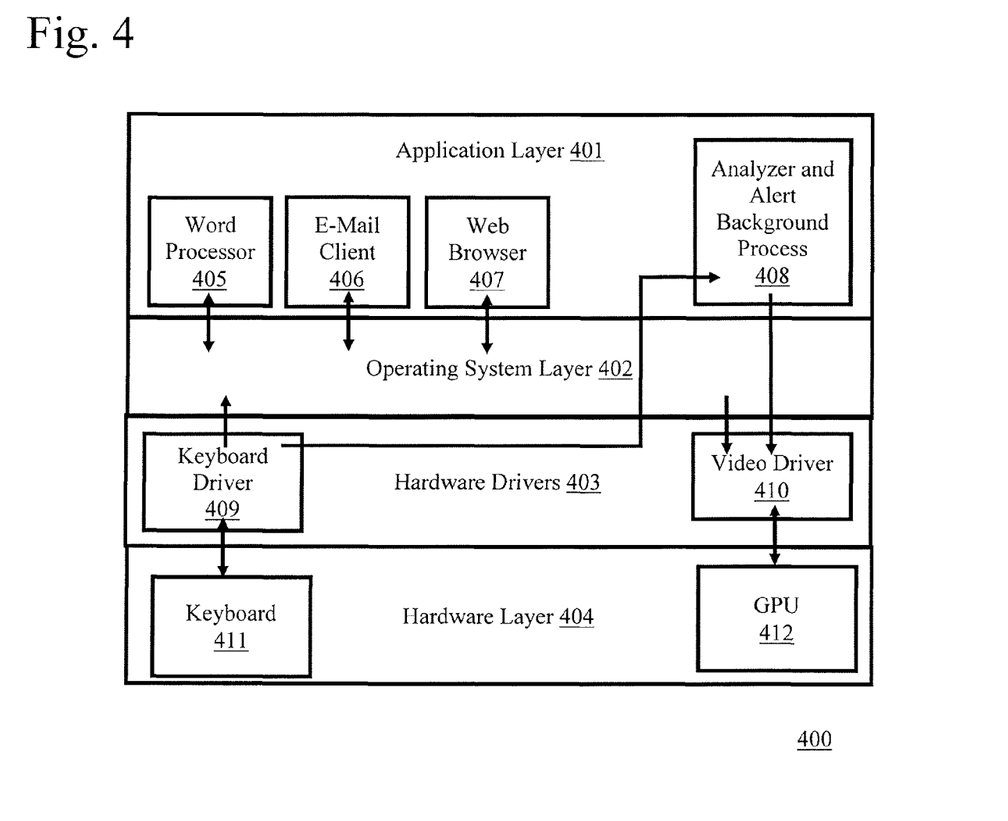
FIG. 4 is a schematic diagram illustrating an approach for implementing real-time sensitive word and phrase detection and alerting in software executing on a general purpose computer system in accordance with exemplary embodiments of the present invention.

FIG. 4 is a schematic diagram illustrating an approach for implementing real-time sensitive word and phrase detection and alerting in software executing on a general purpose computer system in accordance with exemplary embodiments of the present invention. The general purpose computer system 400 may have a hardware layer 404 in which physical components thereof are provided. These physical components may include a CPU, RAM, hard drive, etc. and may also include a keyboard 411 and graphics processing unit (GPU) 412, without regard to whether the GPU is integrated into the CPU or is discrete.

An operating system layer 402 may communicate with the hardware layer 404 via a set of installed hardware drivers 403. These drivers 403 may include a keyboard driver 409 and a video driver 410. An analyzer and Alert background process 408 may run on top of the operating system layer 402, within an application layer 401, along with a set of applications such as a word processor 405, e-mail client 406, and web browser 407. The Analyzer and Alert background process 408 may receive keystroke data from the keyboard driver 409, either directly or via an intermediary, and may be able to perform all of the functions described above for sensitive word/phrase detection. The Analyzer and Alert background process 408 may generate an alert including a text popup window and may display the alert by communicating with the video driver 410, either directly or through an intermediary.

There may be several ways in which keystroke data may be received by the Analyzer and Alert background process 408. For example, a custom keyboard driver 409 may be installed onto the general purpose computer system 400, the custom keyboard driver 409 being programmed to share keystroke data with the Analyzer and Alert background process 408. According to another approach, the Analyzer and Alert background process 408 may utilize operating system API hooks such as to periodically query the operating system 402 for keyboard activity. An exemplary hooking mechanism is described in greater detail below with respect to FIG. 5.

A user of the general purpose operating system 402 may then interact with any application executing on the application layer 401 of the computer system 400 without regard to what application 405-407 is running, keystrokes may be analyzed as described to detect and alert the user to the entry of potentially sensitive words/phrases.

Displaying the text box popup alert may be performed by any available means such as drawing a dialogue box on the screen, which may last for a predetermined length of time, or operating system API hooks may be used to create a notification within the confines of the operating system such as a taskbar notification in Microsoft WINDOWS or a system notification in Apple OSX. Of course, the present invention are not limited to the examples provided, and any available means of alert display may be used.

Figure 5:
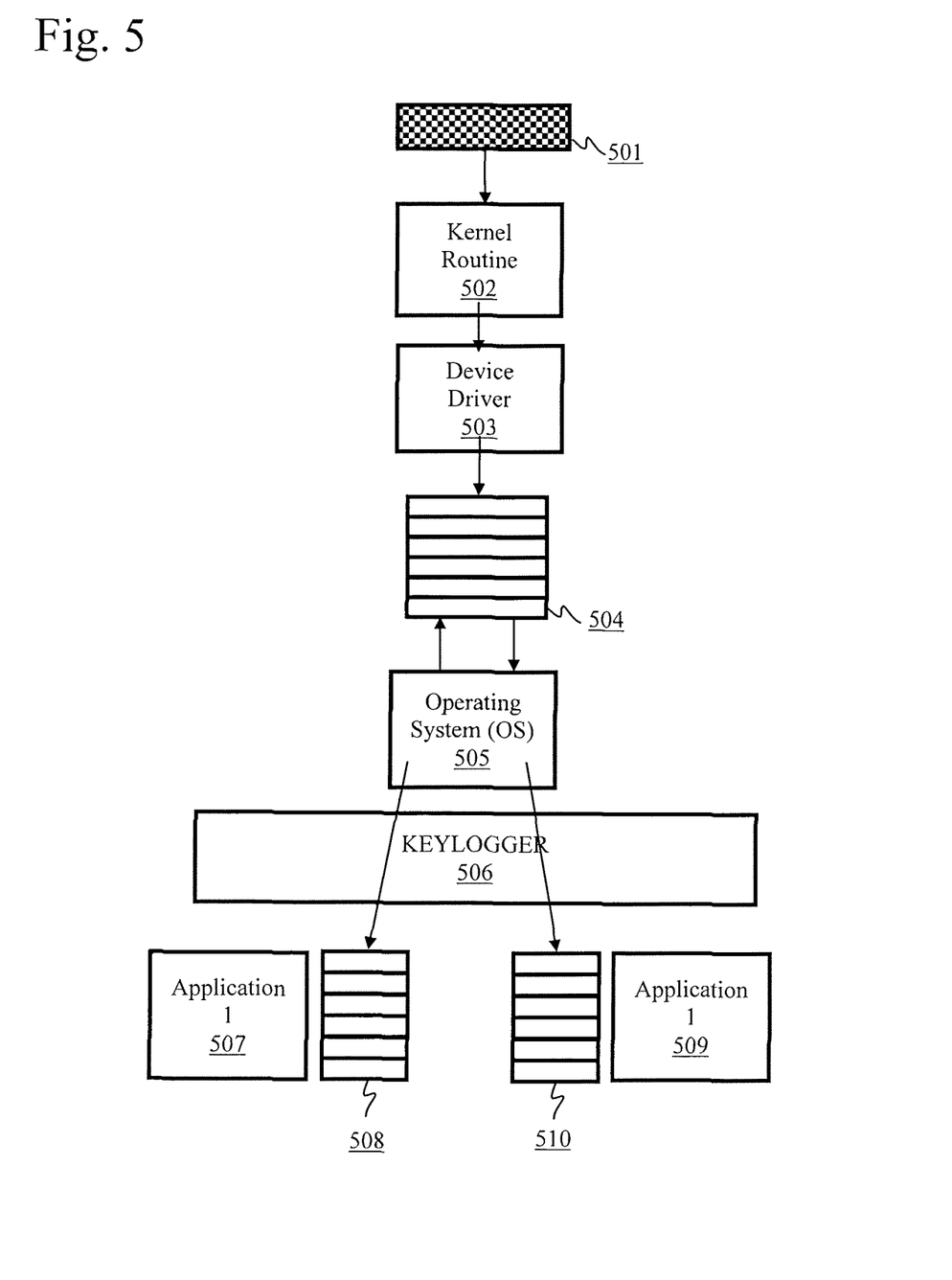
FIG. 5 is a schematic diagram illustrating a hooking mechanism for determining keystrokes and providing alert display in accordance with an exemplary embodiment of the present invention.

FIG. 5 is a schematic diagram illustrating a hooking mechanism for determining keystrokes in accordance with an exemplary embodiment of the present invention. The operating system may utilize one or more hook drivers (DLL) for interacting with hardware and/or applications. A first hook driver may receive keystroke data from a hook server process which periodically polls for keystroke input. The operating system may interact with multiple applications being run thereon, for example, to determine how text is being entered and how a user interface thereof is being displayed so that an optimal determination may be made as to how to display the alerts.

Keystrokes may be detected, for example, using an API hook on the operating system 505. For example, upon pressing a key on a keyboard 501, an interrupt may occur and the corresponding Kernel Routine 502 may get called. The Kernel Routine 502 may thereafter call the ISR of the keyboard Device Driver 503. The ISR may communicate with the keyboard 501 controller and obtain the code of a key pressed. The ISR may then call an OS function which posts the obtained key code to the System Message Queue 504.

The Keylogger component application 506 may register a hook procedure with the OS 505, thereby receiving the message before it is dispatched to the appropriate Application Message Queue 508/510. This hook would not stop the message from being sent to the appropriate application 507/509 and therefore, an application 507/509 being run by the user, for example, an instant message client, or the like, would not be affected by the hook procedure. Additionally, because the text entry occurs at the OS level, rather than at the application level, text being entered to any application may be analyzed without the need to modify the application for use with the text analyzer.

Figure 6:
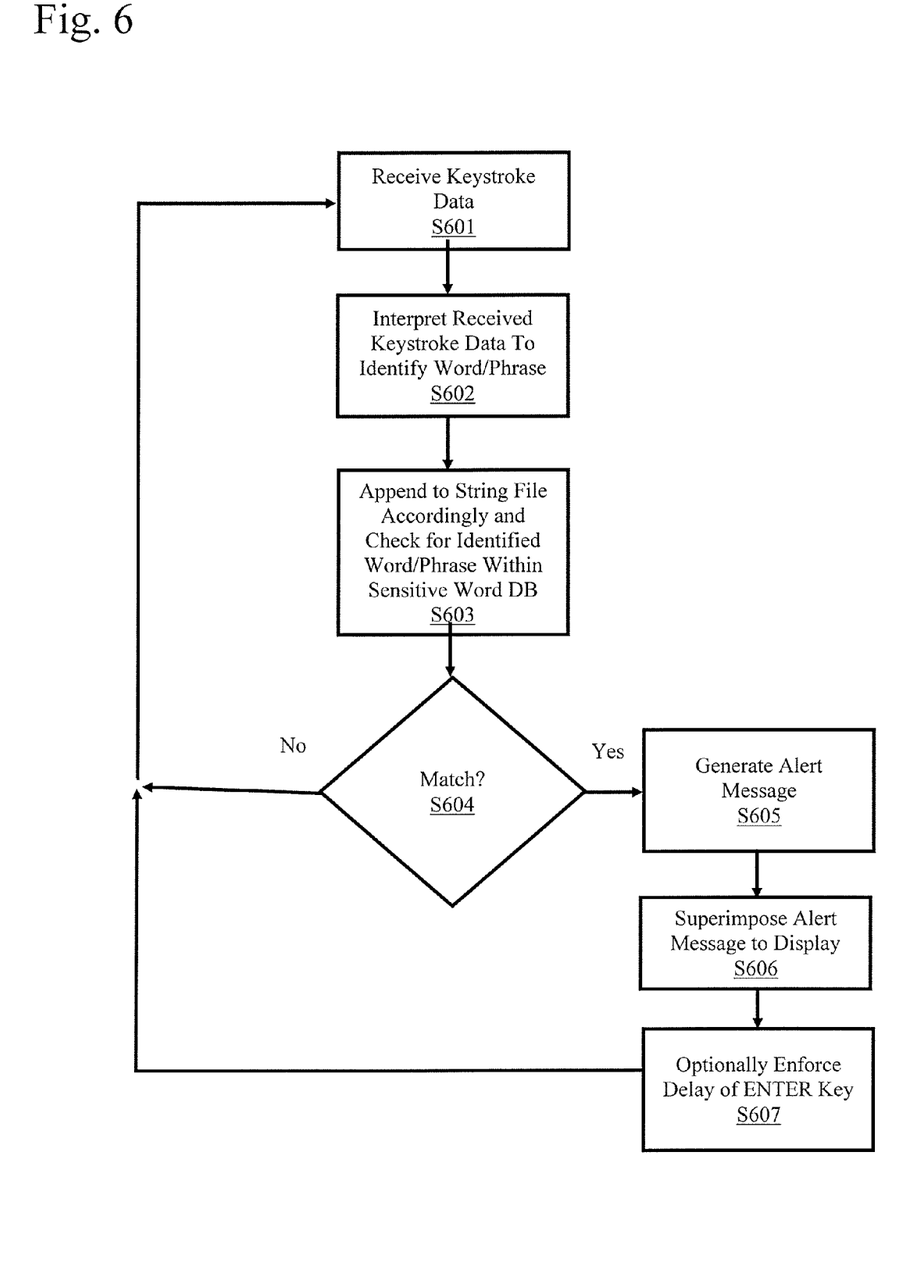
FIG. 6 is a flowchart illustrating a method for real-time detection and alerting associated with the entry of potentially sensitive words/phrases that may be implemented by either the hardware or software components described above in accordance with exemplary embodiments of the present invention.

FIG. 6 is a flowchart illustrating a method for real-time detection and alerting associated with the entry of potentially sensitive words/phrases that may be implemented by either the hardware or software components described above in accordance with exemplary embodiments of the present invention. First, keystroke data may be received S601. This may be performed either using the specialized hardware described above or using API hooks and/or custom hardware drivers. Then, the received keystroke data may be interpreted to determine natural word breaks such as spaces, punctuation, and/or hard returns S602. The presence of such breaks may trigger a clearing of the string file, or at least an understanding that a new word of a phrase is being entered. The string file may then be checked against the contents of the sensitive word/phrase database S603. This word database could be updated centrally by an administrator who could potentially also monitor meta data on matches. If a match is not found (No, S604), additional keystroke data may be appended to the string file so long as a natural break is not detected or a maximum string file size is not exceeded. The appended string file may then be checked against the database for a match.

Updating of the sensitive word/phrase database may be performed from the central administrator either as-needed, periodically or in real-time. In this way, administration of the sensitive word/phrase database may be performed remotely. As there may be a single administrator administrating multiple instantiations of the Keylogger component application executing on multiple computer systems, the administrator, or another user with appropriate credentials, may add or remove a word/phrase from a central database. Changes made to the central database may be replicated at individual machines. The individual machines may maintain local copies of the central database or the central database may include multiple different sensitive word/phrase databases, with each machine maintaining the sensitive word/phrase database that is appropriate for it. Thus the user may make changes to one or more sensitive word/phrase databases and these changes may be pulled down by various client-level machines.

According to one exemplary embodiment of the present invention, the administrator/user may provide a word/phrase for adding or deleting from the central database and may also select which particular sensitive word/phrase databases are to receive the given change. At periodic intervals, for example, every sixty seconds, the updates may be pulled down by the client machines, and the Keylogger component application running on that machine may immediately begin using the updated sensitive word/phrase databases, even if it is already in operation.

When a match is found (Yes, S604), an alert is generated (S605) and superimposed (S606), as described above. Optionally, an audible alert may be generated and/or a text entry delay may be imposed (S607). A text entry delay may block the enter/return key from operating and/or prevent mouse clicks from being effective until a predetermined cooling off period has been reached or the user has agreed to terms of appropriate conduct, as may be displayed by the computer system.

According to some exemplary embodiments of the present invention, rather than maintaining only a single sensitive word/phrase databases, the Keylogger component application may utilize multiple different sensitive word/phrase databases. Each database may include a set of words/phrases that is sensitive for a particular reason and the alert that is generated may be specific for the given sensitive word/phrase databases that the match was found within. For example, a first database may include foul language and a second database may include classified project codenames. If a word is matched in the foul language database, the alert may be presented as a blue text bubble with the message, "Is this language appropriate?" and if the word is matched in the classified project codename database then a red bubble with the message, "Be careful when disclosing classified projects." may be presented in a red text bubble.

Additionally, or alternatively, the words/phrases of a single sensitive word/phrase databases may have a qualitative and/or quantitative value and an alert may be customized for given values.

As discussed above, alerts may be textual displays that are presented to an operator of a computer system executing the Keylogger component application. However, exemplary embodiments of the present invention are not limited to this approach. For example, alerts may also be sent to an administrator and/or may initiate remedial actions in addition to, or instead of, displaying the textual message. According to some approaches, alerts may become increasingly corrective as additional matches are made. For example, first matches may initiate a textual alert, subsequent matches may log the match and/or send a notification of the alert to a system administrator. Still further matches may have more tangible manifestations such as the enforcement of a cooling off period in which access to the computer system is limited or cut off. A particularly high level of corrective action may include a locking out of the computer system and/or user account pending an investigation to be performed by the administrator or some other party.

Where a device similar to what is shown in FIG. 2 is used in combination with corrective action, as described above, the apparatus may additionally include a power-to-computer pass-through and a corrective alert may include discontinuing power to the computer and/or blocking the display pass-through so the computer's display cannot operate properly.

Additionally, exemplary embodiments of the present invention may utilize one or more security protocols in transmitting matched keyboard input to a central server, which may maintain a log of word/phrases on client machines. The security protocols may ensure that no raw keyed input data leaves local machines or is stored on local disk drives, with the exception of matched phrases which are sent in encrypted form, for example, under AES-128 encryption, to the central server over a local area network (LAN) or another form of computer network, in the form of log files. The security protocols may ensure that no data leaves the LAN and any unmatched raw keyed input data is only temporarily held in RAM on local machines.

Figure 7:
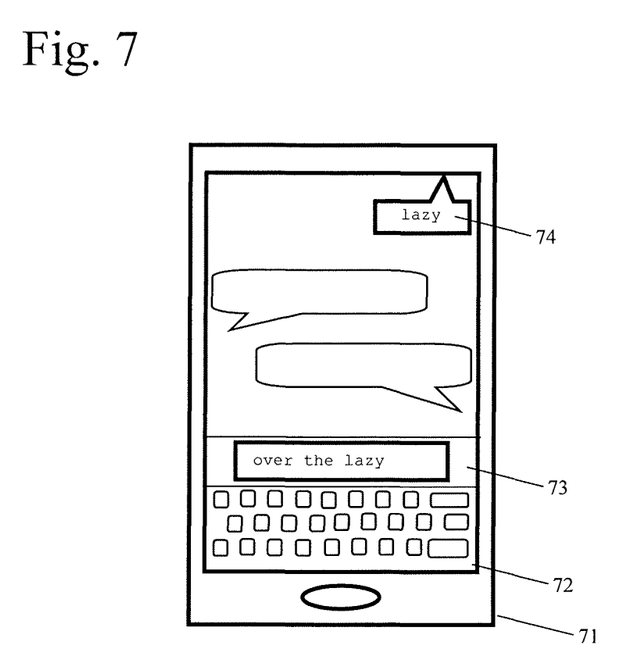
FIG. 7 is a schematic diagram illustrating real-time sensitive word and phrase detection and alerting as applied to mobile platforms in accordance with exemplary embodiments of the present invention.

Exemplary embodiment of the present invention may also have application in mobile platforms such as smartphones and tablet computers. FIG. 7 is a schematic diagram illustrating real-time sensitive word and phrase detection and alerting as applied to mobile platforms in accordance with exemplary embodiments of the present invention. A mobile device 71, such as a tablet computer or smartphone may have a virtual keyboard 72. The virtual keyboard 72 may display the likeness of letter keys and a touch in the vicinity of each letter key likeness may be observed by a touch screen display. Text keyed therein 73 may be monitored either by the use of API hooks, as described above for general purpose computers, or a user of the mobile device may install a custom keyboard, for example, using an integrated application store such as the Apple APP STORE or the Google PLAY STORE. The custom keyboard may be configured to report keystrokes either to an application residing on the mobile device, or on a remote server that is in communication with the mobile device over its Internet connection. The logic for detecting sensitive words/phrases may be substantially as described above, however, detection may occur on the remote server. When a match is made, the resulting alert may be sent back to the mobile device using the device's notifications API using any means of notification available to the mobile device such as a banner notification, a popup alert notification 74 and/or an audible alert or vibration alert.

Figure 8:
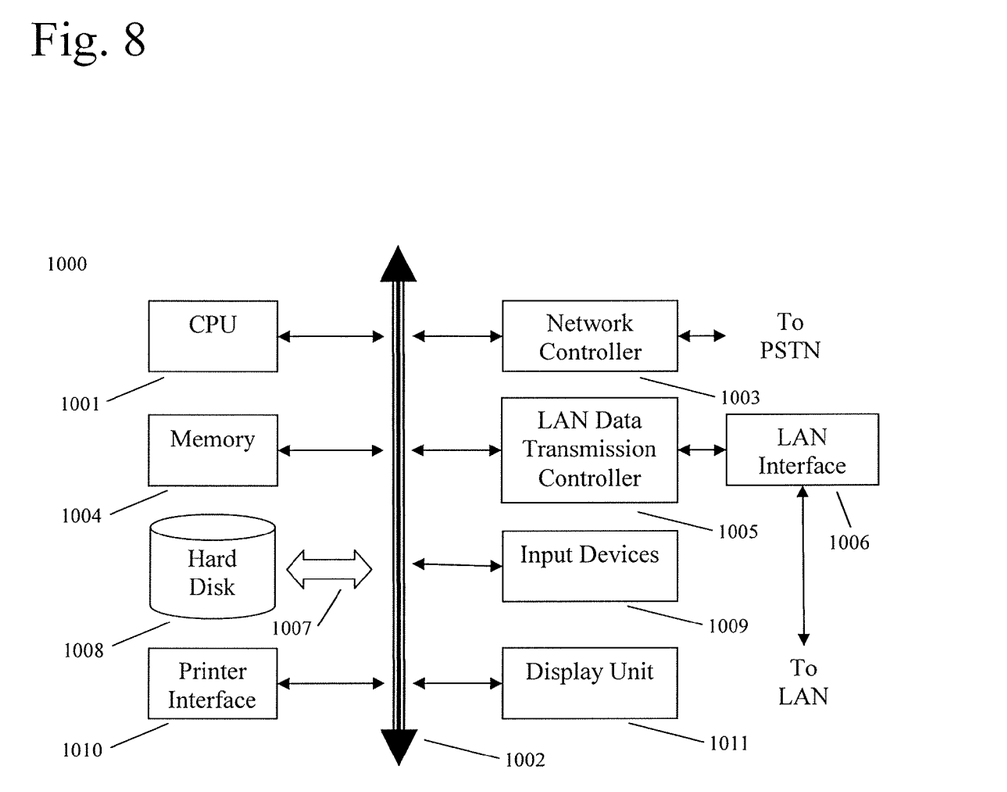
FIG. 8 shows an example of a computer system capable of implementing the method and apparatus according to embodiments of the present disclosure.

FIG. 8 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for providing a sensitive text alert, comprising:
    monitoring a key selected on a keyboard of a computer system;
    reporting the key selected to a key-logger application executing on the computer system;
    appending the reported key selected to a string file;
    comparing at least one portion of the string file to a database of sensitive words/phrases;
    blocking or delaying text entry on the keyboard when it is determined that compared at least one portion of the string file matches an entry in the database of sensitive words/phrases;
    generating an alert when it is determined that the compared at least one portion of the string file matches an entry in the database of sensitive words/phrases; and
    superimposing the generated alert on a display device of the computer system, wherein the blocking or delaying of the text entry is ended when a predetermined cooling off period has been reached or a user of the computer system has agreed to terms of appropriate conduct.

2. The method of claim 1, wherein the monitoring and reporting of the key selected is performed by a custom or modified keyboard driver installed on the computer system.

3. The method of claim 1, wherein the monitoring and reporting of the key selected is performed by periodically query an operating system executing on the computer system for keyboard activity using an API hook.

4. The method of claim 1, wherein the database of sensitive words/phrases is periodically updated from a central repository that is connected to the computer system over a computer network.

5. The method of claim 1, wherein generating the alert includes:
    determining an alert category by reading alert-category information associated with a matched entry from the database of sensitive words/phrases; and
    generating a custom alert for the determined alert category.

6. The method of claim 1, wherein the generated alert is canceled when a monitored subsequent key selected is appended to the string file that negates the match.

7. The method of claim 1, wherein the superimposing of the alert on the display device is performed by a custom or modified display driver installed on the computer system.

8. The method of claim 1, wherein in addition to superimposing the generated alert on a display device of the computer system, a sound is generated.

9. The method of claim 1, further comprising:
    encrypting the at least one portion of the string file, transmitting the encrypted at least one portion of the string file, as a log file, to a remote server over a computer network, when it is determined that the at least one portion of the string file matches the entry in the database of sensitive words/phrases.

10. A system for providing a sensitive text alert, comprising:
    a keyboard input port for receiving a keyboard signal from a keyboard device;
    a keyboard output port for passing the received keyboard signal from the keyboard input port to a computer system;
    a logic unit, disposed between the keyboard input unit and the keyboard output, for receiving the keyboard signal from the keyboard input port, analyzing the received keyboard signal, and passing the received keyboard signal through the keyboard output port to the computer system;
    a video input port for receiving a video signal from the computer system; and
    a video output port for passing the received video signal from the video input port to a display device of the computer system,
    wherein, in analyzing the received keyboard signal, the logic unit is configured to compare the received keyboard signal to a database of sensitive words/phrases, determine when a match has been made between at least a portion of the received keyboard signal and an entry in the database of sensitive words/phrases, generate an alert when it is determined that a match has been made, and superimpose the generated alert over the received video signal before it is passed to the video output port, wherein the logic unit is additionally configured to end the blocking or delaying of the text entry when a predetermined cooling off period has been reached or a user of the computer system has agreed to terms of appropriate conduct.

11. The system of claim 10 further comprising:
    a power input port for receiving electrical power;
    a power output port for supplying the computer system with the electrical power received by the power input port; and
    a power disconnection circuit configured to interrupt power sent from the power input port to the power output port upon receiving an instruction to do so from the logic unit,
    wherein the logic unit is additionally configured to send instructions to interrupt power to the power disconnection circuit when the generated alert meets predetermined criteria.

12. The system of claim 10, additionally comprising a speaker unit to produce a predetermined sound when an alert has been generated.

13. The system of claim 10, wherein the logic unit is additionally configured to block or delay the passing of the received keyboard signal to the computer system when the match has been made between the at least a portion of the received keyboard signal and the entry in the database of sensitive words/phrases.

14. The system of claim 10, additionally comprising a local area network adapter or a WiFi adapter to receive updates to the database of sensitive words/phrases from a remote server via a computer network without the involvement of the computer system.

15. The system of claim 10, additionally comprising a local area network adapter or a WiFi adapter to send an indication of the generated alert to a remote server via a computer network without the involvement of the computer system.

16. The system of claim 10, additionally comprising:
    a digital-to-analogue converter for converting the received video signal into an analogue video signal;

a graphics processor device of the logic unit for superimposing the generated alert over the analogue video signal; and an analogue-to-digital converter for converting the alert-superimposed analogue video signal into a digital video signal for being passed to the video output port.

17. The system of claim 10, additionally comprising:

a security protocol, embodied in the logic unit, for encrypting the received keyboard signals and transmitting the encrypted keyboard signals to a central server as a log file when it is determined that a match has been made between the at least a portion of the received keyboard signal and the entry in the database of sensitive words/phrases.

18. A method for providing a sensitive text alert, comprising:

monitoring key selection data on a custom on-screen keyboard installed on a mobile electronic device and transmitting the key selection data, from the custom on-screen keyboard, to a central server via an Internet connection maintained by the mobile electronic device;

receiving an indication from the central server when the key selection data is determined to be a sensitive word/phrase;

blocking or delaying text entry on the keyboard when it is determined that the compared at least one portion of the string file matches an entry in the database of sensitive words/phrases;

generating an alert when the indication is received; and displaying the generated alert on a display device of the mobile electronic device, wherein the blocking or delaying of the text entry is ended when a predetermined cooling off period has been reached or a user of the computer system has agreed to terms of appropriate conduct.

\* \* \* \* \*